May 14, 1963 G. B. HILL 3,089,300
DOUBLE SICKLE MOWING MACHINE
Original Filed June 4, 1956 3 Sheets-Sheet 1

Inventor
George B. Hill
By Allan R. Redrow
Attorney

May 14, 1963  G. B. HILL  3,089,300
DOUBLE SICKLE MOWING MACHINE
Original Filed June 4, 1956  3 Sheets-Sheet 2

Inventor
George B. Hill
By Allan R. Redrow
Attorney

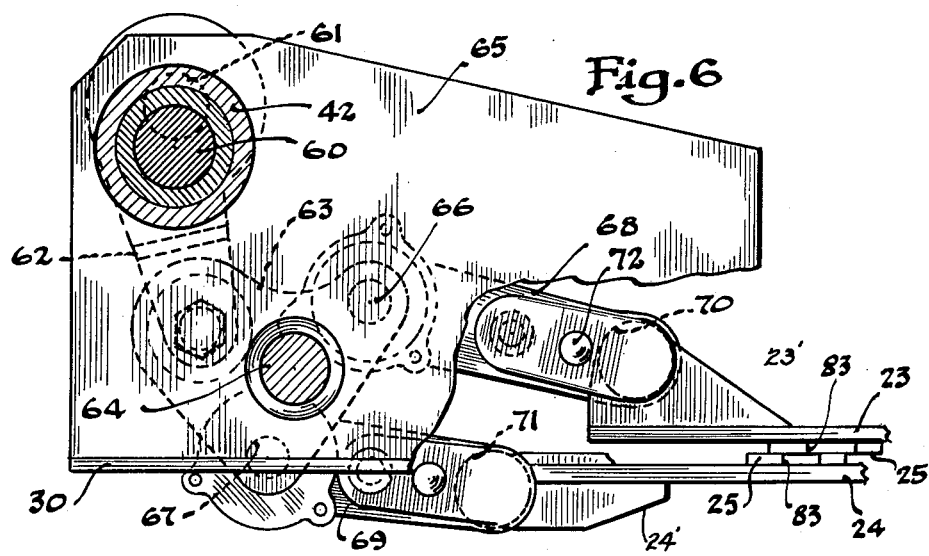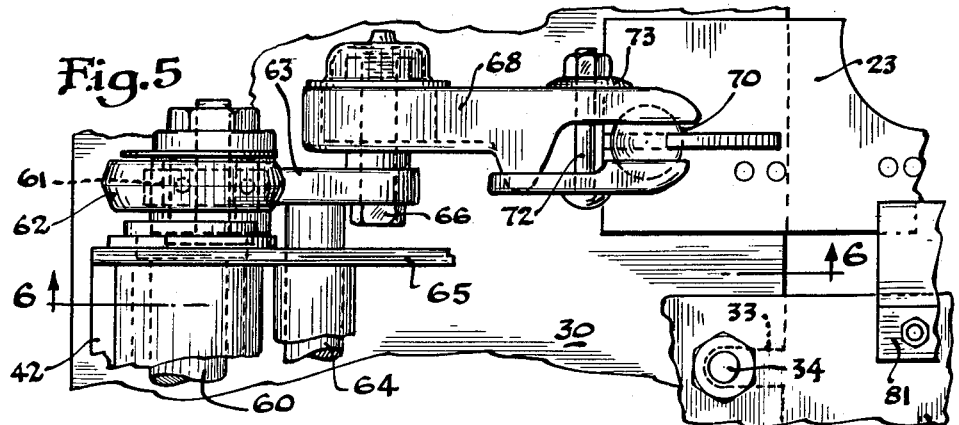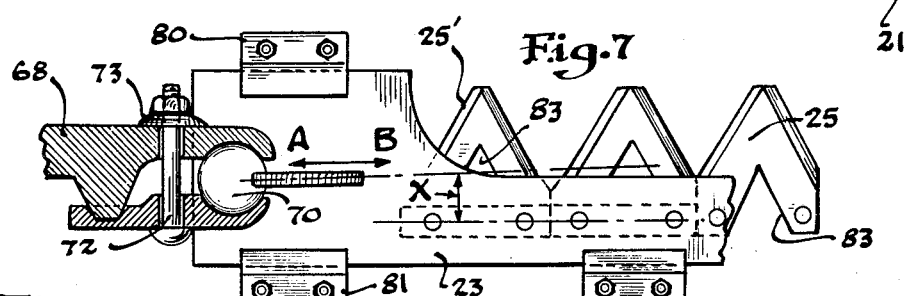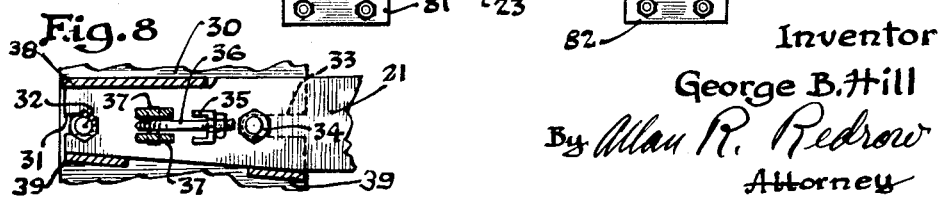

United States Patent Office 3,089,300
Patented May 14, 1963

3,089,300
DOUBLE SICKLE MOWING MACHINE
George B. Hill, Lewis Road, R.F.D. 3, Bethesda, Md.
Original application June 4, 1956, Ser. No. 589,168, now Patent No. 2,931,159, dated Apr. 5, 1960. Divided and this application Nov. 19, 1959, Ser. No. 854,130
1 Claim. (Cl. 56—25)

This invention relates to a mowing machine and more particularly to an improved double sickle mower construction.

This application is a division of my earlier application Serial No. 589,168, now Patent No. 2,931,159, granted to me on April 5, 1960.

Various types of double sickle mowers have been proposed in the past; however, none of these machines, despite obvious theoretical advantages, have ever been popularized in the farm industry. The present invention overcomes certain defects of the prior art and provides an improved structure of this type having an efficient and inexpensive drive mechanism. In addition, improvements are provided in the double sickle cutting structure itself as well as the mounting of the cutter bar on the mower shoe and the frame support whereby a simplified and highly practical mowing machine results.

Referring to the drawings, FIGURE 1 is a fragmentary plan view of the mowing machine of this invention.

FIGURE 5 is an enlarged detailed top plan view of the double sickle mower drive means.

FIGURE 6 is a rear elevation of the double sickle drive mechanism taken on line 6—6 of FIGURE 5.

FIGURE 7 is a detailed top plan view partly broken away and shown in section of the sickle bar structure with its sliding bearing supports and the knife sections mounted thereon.

FIGURE 8 is a detailed top plan view of the mounting means for fastening the cutter bar to the shoe element.

Figure 1:
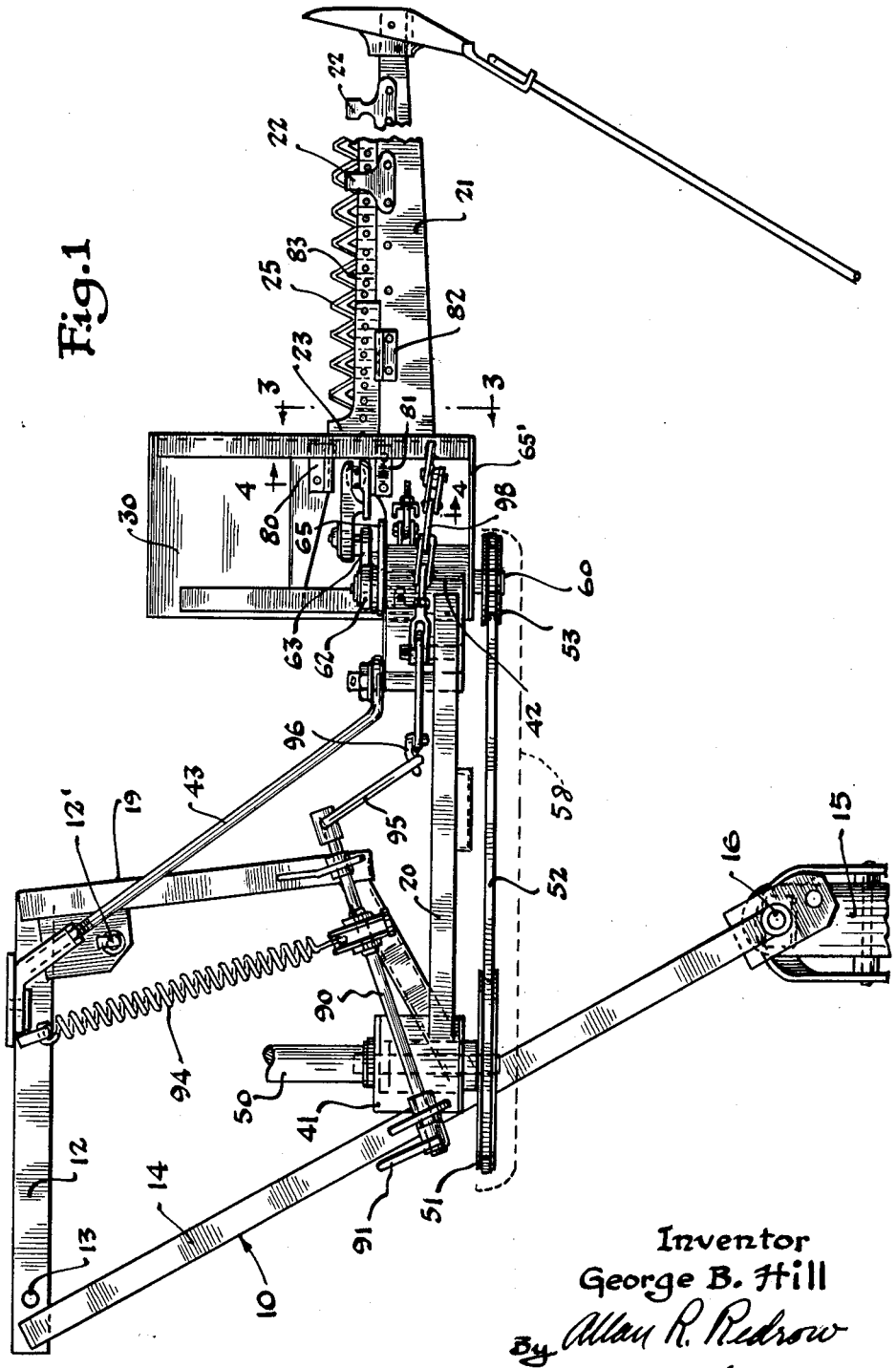

The preferred form of the mower is illustrated in the drawings and as shown here it is a semi-mounted trail mower adapted to be carried from a frame suspended between the draw bar of the tractor and a caster wheel pivoted to the end of the mower frame. The frame supports the cutter bar structure which extends outwardly laterally therefrom behind the tractor during mowing operations and conventional mower adjusting and positioning means may be mounted to cooperate between the frame and the cutter bar to accomplish the necessary lifting of the cutter bar during movement of the mower to and from the field and adjustment of the cutter bar to the contour of the field during its operation.

An improved drive system including a V belt connection between the driving and driven pulleys and a cooperating frame for mounting the V belt drive and the double sickle mower is provided. The mounting includes a spacing means for the pulleys while at the same time providing the main support for the mower shoe and cutter bar.

The invention further includes a construction whereby the cutter bar may be quickly mounted on or detached from the mower shoe. To accomplish this, a pair of laterally spaced positioning means are provided which cooperate between the cutter bar and the shoe such that by means of a simple bolting arrangement, the cutter bar may be permanently attached to the shoe for efficient operation. When it is necessary to remove the sickle members to replace the knife sections, the bolts are merely loosened, the drive means are disconnected from the sickle bars, and the cutter bar may then be lifted away from the shoe. Thereafter, the knife sections may be pulled out of the cutter bar for repair from the inner end thereof.

The mower above described is adapted to be carried on a frame having an underslung construction such that the center of gravity of the mower mass is always disposed below a line drawn between the top of the caster wheel support and the draw bar on which the front end of the frame is carried. Thus, a very stable carrying means is provided at all times for transporting the mower and for supporting it in the field. The frame includes a main support bar and auxiliary members and the structure is adapted to be carried from the draw bar with the usual breakaway means to permit the mower to swing backwardly to move around obstacles.

An improved knife section is provided for the double sickle cutting means, which incorporates a self-cleaning action. The knife sections are shaped such that as the blades carried by the two sickles reciprocate over each other, debris which would otherwise tend to collect between the rubbing faces of the double sickle means is worked rearwardly to be discharged over the rear edge of the sickle bars.

Figure 3:
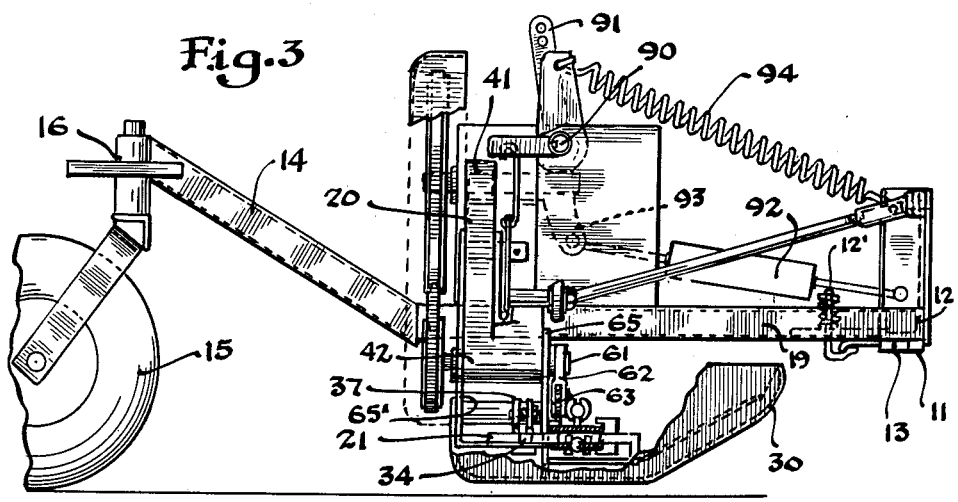
FIGURE 3 is a view of the mower taken on line 3—3 of FIGURE 1 with the shoe element partly broken away.

Referring more particularly to FIGURES 1 and 3 for a detailed description of the machine, the frame of the mower generally denoted 10, is provided with a laterally disposed mounting bar 11 (see FIGURE 3) which is adapted to be carried by the draw bar of the tractor. A pivotally mounted channel section 12 is carried over the bar 11, the bar 12 being pivoted at 13 on the bar 11, the bars 11 and 12 normally being carried in overlaying relationship. Should the cutter bar encounter an obstruction during normal operation however, the spring latch means 12' is adapted to become disengaged and the frame 10 will swing rearwardly in a clockwise direction around pivot 13 until the cutter bar clears the obstruction. Thereafter, the mower may be returned to its original position and breakaway latch 12' re-engaged so that normal operations may be continued. This part of the structure is conventional and is used on many mowers today.

Frame 10 includes a generally rearwardly and diagonally directed main bar 14 which extends from the left hand end of bar 12 rearwardly to the caster wheel 15 which is supported from the rear end of main bar 14 by the pivoting joint 16. The longer portion of the bar 14 extends rearwardly from the tractor in a plane about level with the draw bar for supporting the mower construction and its drive means and the tail end portion of the bar 14 angles upwardly to a position somewhat above the caster wheel 15. This element of the construction is well shown in FIGURE 3.

The frame 10 is completed by the auxiliary side member 19 which is formed integral with the free end of bar 12, and extends from the draw bar generally rearwardly and is then turned inwardly to be joined to the main bar 14. The spring latch means is mounted between side frame member 19 and the cross bar 20 to cooperate in a conventional manner to release the frame to permit it to swing free when an obstacle is encountered.

The mower is pivotally carried on the laterally extending support bar 20 from the frame during normal operation as will be described more fully below, and the mower may be adjustably positioned and raised and lowered by conventional means.

The mower mechanism includes a cutter bar 21 having sickle bar guide means 22 fixed thereto, the bar being preferably constructed and arranged to receive the two reciprocating sickle bars 23 and 24. The sickle bars 23 and 24 are adapted to be driven simultaneously in opposite directions whereby the knife sections 25 carried on the respective bars are driven past each other to effect the desired mowing action as the mower is pulled through the field.

The cutter bar 21 is carried from the mower shoe 30 to be projected laterally outwardly from the shoe while performing its cutting operations and this invention includes means whereby the bar may be mounted in a manner to be quickly removable from the shoe to effect quick replacement of the sickle bar elements when repair is required. To accomplish this, the bar 21 is provided with a forked inner end 31 which is adapted to cooperate with the bolt 32 carried at its inner side by shoe 30. At its outer or grassward edge, the floor of shoe 30 has a locating slot 33 cut therein but spaced laterally outwardly from the bolt 32. The cutter bar 21 is provided with bolt 34 which extends downwardly for engaging in and cooperating with the slot 33. The upper surface of the cutter bar 21 carries a generally vertically extending channel member 35 which is slotted to receive the eye bolt 36, the eye of which is pivotally carried between ears 37 carried from a bearing means supported from shoe 30. Suitable walls 38 and 39 are disposed on opposite sides of the inner wedge shaped end of the cutter bar 21 to cooperate therewith and provide a firm seat for the bar on the shoe.

When the cutter bar is moved into position such that its inner forked end 31 is engaged on bolt 32, bolt 34 is fitted into slot 33 and eye bolt 36 is tightened to draw the end of cutter bar home on the seat formed by walls 38, 39, the bar is properly located for cutting operations. The eye bolt 36 then being tightened down firmly in the slot provided in channel member 35, the bolts 31 and 34 may be tightened to permanently affix the cutter bar relative to the shoe and after the sickle bars have been connected to the drive mechanism, cutting operations may proceed. When it is necessary to sharpen or repair the knife sections, the cutter bar may be quickly removed from shoe 30 by merely loosening bolts 31, 34, and 36 and after the drive connections are removed the cutter bar may be lifted from shoe 30 and the knife sections pulled out of the cutter bar past its inner forked end 31. This structure provides a very simple arrangement for making possible the repair of the sickle bar cutting elements.

As above stated, the mower is pivotally supported from the frame 10 at the outer end of the lateral support bar 20. The bar 20 is pivotally carried at its inner end by means of suitable bearing 41 mounted on the frame 10 and at its outer end, the bar 20 is pivotally mounted on the shoe in a bearing means 42 which is carried in means formed integral with the shoe 30. Thus, the shoe 30 and cutter bar 21 may be turned about the pivotal bearing 42 to adjust the angle of the cutter bar to the contour of the ground or to raise the cutter bar past vertical to its carrying position so that the mower may be transported to and from the field. It is also to be noted that after the cutter bar is raised to its carrying position, the cutter bar and shoe may be further raised by lifting the lateral support bar 20 about its inner bearing end 41 carried on the frame 10. An auxiliary guiding and support bar 43 may be provided to assist in supporting the shoe 30 from the frame 10, the auxiliary bar likewise having a pivotal connection at both ends with frame 10 and shoe 30.

A drive system is provided for transmitting motion from the power take-off of the tractor to the sickle bars and for this purpose, a suitable drive shaft 50 is adapted to be connected between the power take-off and a V belt drive train. The shaft 50 is operatively coupled to driving pulley 51 which is rotatably carried in a bearing generally concentrically arranged with respect to the bearing 41 provided at the inner end of lateral support bar 20. The driving pulley 51 cooperates with a V belt means 52 which engages over the driven pulley 53 carried on a suitable bearing, the axis of which is arranged generally parallel to the axis about which driving pulley 51 rotates.

The bearing for the driven pulley 53 is also positioned generally concentrically with respect to the bearing 42 provided at the outer end of the lateral support bar 20. With this construction it is apparent, that shoe 30 may be raised and lowered to any position at the end of support arm 20 while the axes of rotation for the driving and driven pulleys are maintained a fixed distance apart and in a generally parallel relationship such that regardless of the position of the shoe, the V belt drive is operative to transmit power from shaft 50 to driven pulley 53 which is connected to the sickle drive mechanism carried by the shoe. It is to be noted that the lateral support bar 20 may carry one or more idler pulleys 54 and 55, if required, to provide means for taking up any slack in the V belt. More particularly, the idler pulley 55 may be carried on a bar 56 provided with a slot 57 for adjustably mounting the bearing means for the pulley 55. It is to be noted that the bar 56 which may be fixedly carried about midway of the lateral support bar 20 is adapted to support the housing 58 which covers the drive pulleys and V belt so that the entire pulley driving mechanism including the slack take-up and protective housing move as a unit during the raising and lowering of the mower.

The drive mechanism for oscillating the sickle bars is carried on the mower shoe 30, see FIGURES 1, 5, and 6, which is pivotally supported at the outer end of the support bar 20, and this mechanism includes the driven pulley 53 keyed to the rear end of a longitudinally extending shaft 60 which, as its forward end, drives a crank 61. The crank 61 in turn drives a connecting rod 62 which drives a rocker element 63. The rocker 63 is mounted for oscillation on the relatively fixed bearing 64 supported from the fixed wall 65 carried integral with the shoe 30. The rocker 63 is provided with a pair of bearing studs 66 and 67 disposed on opposite sides of the fixed bearing 64, the studs being adapted to cooperate with connecting rods 68 and 69 respectively which, in turn, are connected to the ball driving elements 70 and 71 carried by the knife head ends 23' and 24' of the respective sickle bars 23 and 24.

As best seen in FIGURES 5 and 7, the upper knife section 23 is adapted to be driven by the connecting rod 68 which engages over the ball connection 70 integral with the knife head, the connecting rod 68 being provided with a pair of clamping socket members at its outer end, which are drawn tight against the ball 70 by a bolt 72 which is adapted to be tightened down on the resilient washer 73 to hold the connecting rod tightly but resiliently engaged at all times on the ball 70. The knife head portion of sickle bar 23 is carried for sliding motion in the guide bearings 80, 81, and 82. These three bearing means are positioned in the manner shown to absorb any unbalance of forces such as may be imposed in the knife section in operation such as will result from the connection between the connecting rod 68 and ball joint 70 which is offset with respect to the center line of the knife head of sickle 23 a distance equal to X. Thus, as the connecting rod 68 tends to drive the sickle bar in one direction or the other and the motion of the bar is retarded by the mowing action, there is a turning moment produced which is equal to the driving force multiplied by the radius X. When the sickle 23 is moving to the right as indicated by arrow B in FIGURE 7, the bearing 82 is provided to guide the sickle and eliminate any deviation from its true straight line reciprocating motion, the bearing 82 serving to absorb the turning force or moment produced in this manner. When the sickle bar is reciprocated in the direction indicated by the arrowhead A, a similar turning moment is produced which tends to turn the sickle in a counter clockwise direction. This tendency, however, is counteracted by the normal action produced by driving the mower into the crop being cut so that there is no necessity of providing a guide bearing corresponding to 82 for counteracting this turning moment.

The sickle bar 24 is similarly carried for sliding reciprocation in bearings 80, 81, and 82 so that turning moments produced by the driving action of connecting rod 69 are likewise balanced out within the mechanism mounted on shoe 30.

In the operation of the drive structure, as the crank 61 is rotated, the connecting rod 62 causes the rocker element 63 to oscillate and as the rocker moves about its bearing 64, the connecting rods 68 and 69 drive the sickle bars 23 and 24 whereby the knife sections 25 are caused to move simultaneously in opposite directions past each other to effect the mowing operation.

Figure 4:
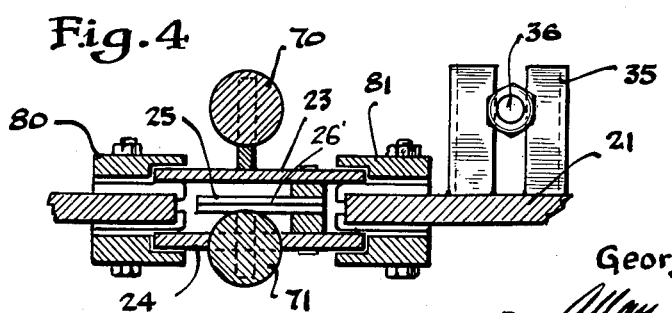
FIGURE 4 is an enlarged view taken on line 4—4 of FIGURE 1.

Referring specifically to the sickle bar construction itself, it is seen that the knife sections 25 are adapted to be removably affixed to the cooperating sickle bars as best shown in FIGURES 4 and 7. The knife sections have a conventional external form and are thus provided with a body section having pointed cutting portion 25' with sharpened cutting edges. The cooperating knife sections fixedly secured on the sickles 23 and 24 are arranged to cooperate in such a manner as to provide the most efficient shearing action. It is evident, however, that to accomplish this the knife sections must be reciprocated in a close face-to-face relation so that the shearing edges are rubbed against each other to accomplish the cutting.

It has been found in normal operation, however, that dirt tends to accumulate between the knife sections as they rub together and, in time, the juices flowing from the crop being cut tend to ball the dirt up such that the cutting edges of the knife sections of a double sickle mower can be held so far apart as to interfere with the cutting action. To eliminate this undesirable effect, the body portion of knife sections 25 of the present invention have been provided with a construction as shown in FIGURES 6 and 7 that produces a self-cleaning action whereby the debris which would otherwise tend to accumulate between the knife sections is automatically eliminated as the sickles are reciprocated. To produce this result, the body portion of each of the knife sections 25 is provided with a planar rubbing face 26' FIG. 6 and a V shaped notch 83, of which may be disposed generally parallel to the cutting edges. The edges of the V notch on the respective knife sections carried on the cooperating sickles 23 and 24 are disposed to rub past each other as the knife sections reciprocate so that the edges of the several V slots provide a scraping action to cause the accumulated debris to fall into the notch whereby the cooperating faces of the knife sections are kept clean. Upon continued reciprocation of the sickle bars, due to the slope of the walls of V shaped notches, the reaction of the debris accumulating in the V slot 83 upon being pushed against the angled walls of the V slots gradually works the debris backwardly until it falls out of the rear portion of the mower. This provides an automatic cleaning action for eliminating debris which would otherwise tend to accumulate between the cooperating faces of the double sickle mower to interfere with the efficient rubbing action needed for the mowing action.

The mower structure of the present invention is completed by the incorporation of a conventional linkage mechanism for raising and lowering the mower, and this linkage best shown in FIGURE 1 includes the oscillating shaft 90 carried on suitable bearings across the frame members 14 and 19. The drive shaft 90 may be oscillated by means of a manually operated lever 91 or a suitable hydraulic servo motor 92 such as is shown in FIGURE 3 which cooperates with a lever 93 to effect oscillation of the drive shaft 90. A counterbalancing spring 94 may be provided, the spring 94 being selected to just about balance the weight of the mower mechanism carried by the lifting linkages.

Figure 2:
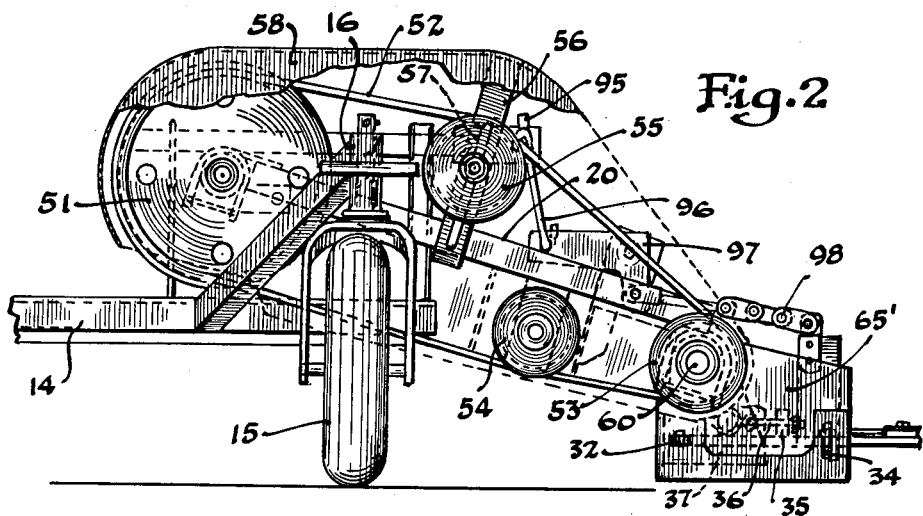
FIGURE 2 is a rear elevation of the mechanism shown in FIGURE 1, partly broken away.

At its outer end, the oscillating shaft 90 carries a rearwardly extending lever 95 integral therewith which connects with link 96, see FIGURE 2 which, in turn, at its lower end engages the bell crank 97. The bell crank 97 is mounted for oscillating movement on the pivoting support bar 20 and is adapted to control the flexible link element 98 connected to the shoe 30 at a point somewhat above the horizontal plane of the axis for pivot 42 provided at the outer end of support bar 20.

In the operation of this lifting and adjusting mechanism, as the manual lever 91 is pulled forwardly shaft 90 is moved in a direction to raise the lever 95 and cause link 96 to rotate bell crank 97 in a direction to draw the flexible link 98 taut whereby the entire cutter bar and shoe elements are caused to rotate about the axis of pivot 42 upon which the shoe is carried. This effects a raising of the cutter bar as this structure turns about the pivot axis disposed at the outer end of lateral support bar 20. The cutter bar may be raised to any adjusted position for following the contour of the soil, or if the mower is to be transported to another location, the cutter bar 21 may be lifted until it is raised to the vertical position or even beyond whereupon the upper arm of bell crank 97 is then turned to a substantially straight line position with respect to link 96 so that upon continued movement of lever 91 forwardly, shaft 90 is rotated so that lever 95 lifts link 96 which in turn lifts bell crank 97 and the lateral support bar 20. In this manner, the already raised cutter bar and shoe are lifted higher off of the ground as the support bar 20 rotates about its inner pivot 41. The drive shaft 90 is then rotated further until the shoe is raised to the proper height for transporting the mower to and from the field.

It is to be noted that when the cutter and shoe are first raised and then subsequently lifted off of the ground, the center of gravity of the entire mass is cradled on the frame at a point below the high point of the rear end of the frame 10 carried by the caster wheel 15 such that a very stable relationship prevails. The mass of the mower structure is carried in a manner such that there is no tendency to tip the frame and thus the mower may be rapidly trailed over very rough terrain without any danger of upsetting the structure.

In the operation of the mechanism, the bar 10 of the mower is first attached to the tractor draw bar and the mower pulled to the field. The drive connection between the power take-off and driven pulley 51 is then established through drive means 50 and the mechanism is ready for operation. In this connection, it is to be noted that the sickle bar mechanism may be operated in either a vertical position or at any angle between vertical and horizonal because of the V belt drive and rocker oscillating structure provided on the shoe 30. In normal operation, however, the shoe 30 would be lowered to the ground at the outer end of the lateral support bar 20 and thereafter the cutter bar 21 would be lowered so that it rests in generally a proper parallel relationship with respect to the ground. As the driving pulley 51 is rotated, the driven pulley 53 effects oscillation of the rocker 63 so that the two sickle bars 23 and 24 are oscillated simultaneously in opposite directions. Thereafter the mower may be pulled through the field at a relatively high rate of speed and efficient mowing operations are performed. During the cutting operation, it is apparent that the sickle bars will be oscillated such that the knife sections on the cooperating bars rub against each other to complete the cutting action and, as explained more fully above, due to the V slots provided in the body portions of the knife sections with the mouth of the V facing the rear side, the knives are self-cleaning whereby efficient rubbing contact between the sickle bars is obtained and an efficient severing or shearing action is continuously maintained.

It is apparent that the frame structure and drive system described above can be used with a mowing machine having a single sickle bar while retaining most of the advantages of this mower machine. The drive mechanism carried on shoe 30 and the V belt drive system described above are obviously adaptable to either a single or double sickle mower. Other modifications of the other elements of this mower structure may also occur to those skilled in the art such as the incorporation of this drive mechanism on a fully supported trail mower as distinguished from the semi-mounted mower used to illustrate the preferred form of this invention. The drive system and other elements of mower construction here described might also be easily adapted for use on a fully mounted mower. Such modifications and any others which do occur to those skilled in the art may fall within the scope of the following claim.

I claim:

A tractor-powered mower machine having a frame for supporting a laterally extending shoe and cutter bar assembly and a drive system therefor, said cutter bar having inner and outer ends and carrying a driven sickle cutting means, a pivotal support means having a longitudinally extending axis on said frame, a support bar having inner and outer ends, the inner end of said bar being carried on said frame by said pivotal support, the shoe and cutter bar assembly being pivotally supported on said bar to rotate about a longitudinal axis at the outer end thereof, a rotary system including driving and driven means, means connected between the tractor power source and said driving means, said driving and driven means being mounted to rotate about the longitudinal axes of each of said pivotal supports at the inner and outer ends of the support bar, a casing for surrounding said rotary system including said driving and driven means, said casing being supported integrally with said support bar to be movable therewith, means on the mower shoe to convert rotary motion to reciprocating motion to drive said sickle, driving means connected between said motion converting means and said sickle, said driven means being rotatably mounted in a manner to be operatively connected to said motion converting means, and means for raising and lowering said cutter bar and shoe such that the cutter bar and shoe may be rotated about the axis of said driven means at the outer end of said support bar and said support bar may be rotated about the axis of said driving means when said cutter bar is raised to a generally vertical position whereby said cutter bar and shoe may be lifted off the ground.

References Cited in the file of this patent

UNITED STATES PATENTS

| | | |
|---|---|---|
| 1,939,830 | Paul | Dec. 19, 1933 |
| 2,502,805 | Spurlin | Apr. 4, 1950 |
| 2,503,605 | Abgarian | Apr. 11, 1950 |
| 2,596,902 | Krause | May 13, 1952 |
| 2,601,754 | Brekke | July 1, 1952 |
| 2,706,374 | Porter | Apr. 19, 1955 |
| 2,823,506 | Irving | Feb. 18, 1958 |